United States Patent [19]

Lerner

[11] Patent Number: 4,865,828

[45] Date of Patent: Sep. 12, 1989

[54] REMOVAL OF ACID GASES IN DRY SCRUBBING OF HOT GASES

[76] Inventor: Bernard J. Lerner, 727 Orchard Hill Dr., Pittsburgh, Pa. 15238

[21] Appl. No.: 250,219

[22] Filed: Sep. 28, 1988

[51] Int. Cl.$^4$ .......................... B01J 8/00; C01B 17/00
[52] U.S. Cl. ..................................................... 423/244
[58] Field of Search ........... 423/242 A, 242 R, 240 R, 423/240 S, 244 A, 244 R

[56] References Cited

U.S. PATENT DOCUMENTS

| | | | |
|---|---|---|---|
| 3,976,747 | 8/1976 | Shale et al. | 423/244 |
| 4,105,744 | 8/1978 | Erdoess et al. | 423/240 |
| 4,272,498 | 6/1981 | Faatz | 423/242 |
| 4,454,102 | 6/1984 | Lindau et al. | 423/242 |
| 4,604,269 | 8/1986 | Yoon | 423/242 |
| 4,613,487 | 9/1986 | Yoon et al. | 423/244 |

*Primary Examiner*—Gregory A. Heller
*Attorney, Agent, or Firm*—Olin E. Williams

[57] ABSTRACT

A method for removing acid gases, particularly the sulfur oxides and hydrochloric acid from a hot flue gas without substantially cooling or humidifying the latter consists in withdrawing a small stream of the flue gas, preferably the purified gas, and introducing it into a stream of humid gas consisting of steam and/or humid air containing dispersed therein a finely-divided, porous, alkaline earth metal hydroxide upon which surface is adsorbed at least a monomolecular layer of water, and thereby reacting carbon dioxide in the withdrawn portion of the flue gas with the pore surfaces of the hydroxide to form an alkaline earth metal carbonate thereon. The so-formed reactant in the humid gas is then brought into contact with the main flow of hot flue gas, thereby removing acid gases from the flue gas, the solid reaction products and excess reactant thereafter being separated from the flue gas in a baghouse or electrostatic precipitator, and the so-treated flue gas being discharged to the atmosphere.

5 Claims, 1 Drawing Sheet

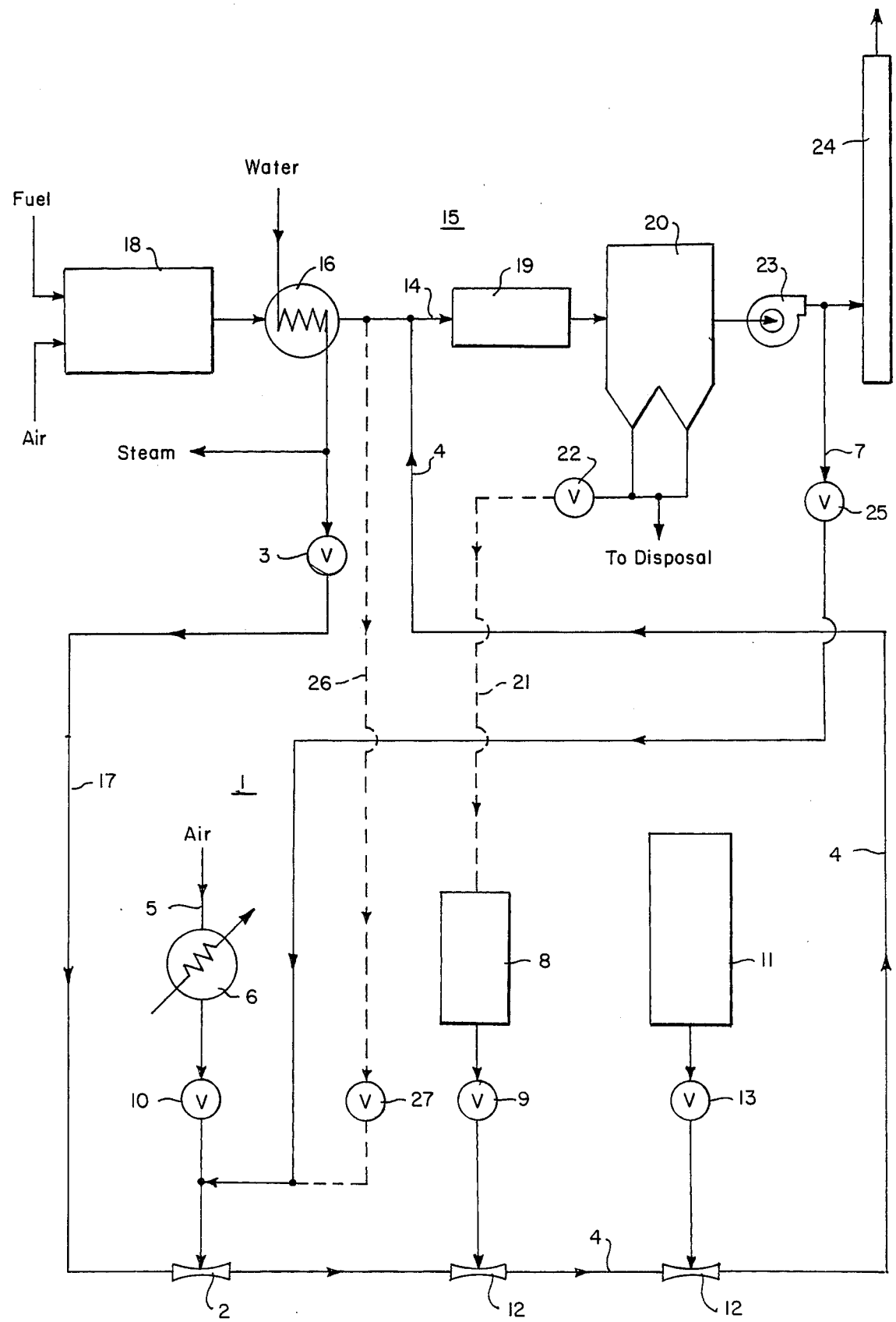

REMOVAL OF ACID GASES IN DRY SCRUBBING OF HOT GASES

This application is a co-pending application of Lerner, Ser. No. 028,572, filed Mar. 20, 1987, and is directed to an improvement in removing acid gases from waste and flue gases, particularly from those flue gases produced in incinerators and by power plants burning sulfur-bearing fuels.

While many processes have been developed for the removal of acid gases from waste gases, these processes, as described in detail in our co-pending application, have either consisted of kinetically slow gas-solid reactions or have required cooling and humidifying the flue gas with its concomitant substantial costs, as well as problems or corrosion and fog generation in the effluent gases. In the aforesaid parent application, these difficulties are overcome by activating the alkaline reactant, or alkaline reactant in combination with a deliquescent compound, by dispersing said reactant and compound in a humid inert gas having a relative vapor tension higher than the fugacity of a monomolecular layer of water thereby absorbed on the reactant.

SUMMARY OF THE INVENTION

A primary object of this invention is to obtain an improved removal of acid gases from flue gases so that the latter may be discharged to the atmosphere without having been substantially cooled or humidified and yet be in compliance with increasingly-stringent acid-gas emission requirements.

Another object of the invention is to enhance the efficiency of the reactant, an alkaline earth metal hydroxide, in removing such acid gases.

It has now been found that the removal of sulfur oxides from flue gas can be considerably improved by employing a separate stream of flue gas added to the steam and/or humid air as the humid gas in which the alkaline reactant, or in other instances, the alkaline reactant and deliquescent compound, are conveyed from their measured admixture into contact with the main stream of flue gas. The adjusted humidity effects adsorption of at least monomolecular layer of adsorbed moisture on the alkaline earth metal hydroxide reactant (and at least partial liquefaction of the deliquescent compound when present) and converts the surfaces of the reactant to an alkaline earth metal carbonate.

The readily available hydrated lime (slaked lime, or $Ca(OH)_2$) is the alkaline earth metal hydroxide of choice, but magnesium hydroxide can also be employed as the basic reactant. Magnesium hydroxide can also be obtained by the slaking hydrolysis of magnesium oxide; the latter is made by calcining magnesium carbonate, which is frequently associated with calcium carbonate in deposits from which hydrated lime is made.

In the practice of the parent invention, when the alkaline reagent is high surface area, porous hydrated lime, $Ca(OH)_2$, and where sulfur oxide is present among the acid gases in the flue gas, some degree of sulfation of the reagent will occur. This sulfation will lead to limited utilization of the interior surfaces of the hydrated lime because of pore blockage by the calcium sulfite and calcium sulfate reaction products formed. These products have a larger molar volume than the $Ca(OH)_2$ and will therefore choke off the pore mouths, hindering gas access to the interior pores. Even though pore surfaces are made active for acid gas reaction according to the practice of the parent invention by adsorption of one or more layers of water molecules on the surface of the lime, sulfation blockage of the mouths of the pores with attendant hindrance of gas access to the active interior surfaces prevents full utilization of the moisture-activated surface for additional acid gas reaction.

It has been shown by Snow, Longwell and Sarofim, in the article, "Direct Sulfation of Calcium Carbonate", Industrial Engineering Chemistry Research, Vol. 27, No. 2, pp. 268-273 (1988) that sulfation pore blockage can be avoided by the "formation of a porous product layer caused by the $CO_2$ generated by the reaction between $CaCO_3$ and $SO_2$ and $O_2$". It is therefore advantageous to have any sulfur oxides present in the flue gas react with a surface layer of $CaCO_3$ rather than calcium hydroxide. The sulfur oxide/$CaCO_3$ reaction will then generate a sulfate product layer which is porous to acid gas penetration to the interior pores.

It is known that the alkaline reactant, $Ca(OH)_2$, is substantially unreactive with $CO_2$ in the dry state, but will react with $CO_2$ following adsorption of moisture, to form $CaCO_3$. Normally, hydrated lime is packaged in moisture-proof bags, or stored in dry-gas purged silos, to avoid the adsorption of moisture and "setting" of the bulk material into a hardened mass on subsequent reaction with atmospheric carbon dioxide.

When hydrated lime is used as the active alkaline reactant for flue gases containing sulfur oxides, at least partial conversion of the pore surfaces to calcium carbonate is effected by employing flue gas in the place of a major portion of the air for admixture with the primary conveying steam. In the conveying duct, water is adsorbed on the extended surface of the hydrated lime and the extended surface is thus rendered reactive with the $CO_2$ in the conveying gas. Because the surface area of the reactant is high, and the amounts of $CO_2$ required to effect pore surface reaction to .carbonate are relatively small, short contact times, corresponding to pneumatic duct conveyance times, are adequate for this prereaction to $CaCO_3$ on the solid surfaces. Bulk cementation does not occur because the hydrated lime is dispersed in suspended particulate form in the conveying line of this invention. The reaction is confined to the pore surfaces, both interior and exterior, in the individual particles of lime.

The aforesaid co-pending application does disclose the use of among other alkaline reactants, alkaline earth metal carbonates, including calcium carbonate, but the use of the these componds as non-porous particles provides a limited surface for solid-gas interaction, though enhanced by the presence of adsorbed water, as compared to the carbonated surfaces of the present invention.

BRIEF DESCRIPTION OF THE DRAWINGS

The single FIGURE is a schematic flow diagram showing the dry solid moistening and carbonate forming process operated in an embodiment of this invention of an improved method of removing sulfur oxide gases from flue gases.

DETAILED DESCRIPTION OF THE DRAWING

As shown in the single FIGURE, in the humid solids and carbonation system, 1, steam is admitted to the venturi 2 and insulated line 17 through a throttling valve 3. A proportionately small volume of air is added to the steam by the aspiration of steam venturi 2 from line 5. If a steam-air mixture is desired, then valve 10 is open and the steam venturi aspirates air through line 5. By initially passing the pressurized steam through the venturi 2 and ingesting side-stream air through the venturi vacuum created, a controlled steam-air ratio is generated in the conveying duct. Appropriate variation of the air bleed and steam flow valves provides a conveying steam having controllable steam/air temperature and water partial pressure. Line 5 may contain an optional heat exchanger 6. The need for an air heater such as heat exchanger 6 depends on the quality of the motive steam; it is desired to avoid condensation in line 4 and the steam-air mixture must be maintained above the mixture dewpoint temperature. The partial pressure of water vapor in line 4 is controlled at the desired level by appropriate adjustment of valves 3 and 10. If employed, deliquescent material is fed from silo 8 through a feeder device 9 at a controlled rate of flow to line 4.

As hereinafter described in more detail, a small stream of flue gas may be bled from gas line 14 and passed through valved line 7 into the air feed line 5 downstream of the air feed control valve 10. Preferably, however, a small stream of ash-free and purified flue gas is introduced through line 7 into line 5 by adjustment of control valve 25 under vacuum provided by venturi 2 and into admixture with the humid gas flowing in line 4.

Dry alkaline-earth-metal hydroxide, such as hydrated lime, is fed from silo 11 through a feeder device 13 into the humid gas stream plus the reactant fraction of flue gas flowing in line 4. To prevent backflow of the humid mixture through the solids feed devices, the solids pickup points of line 4 may be venturis 12. The solids mixture is conveyed by the humid gas of line 4, the transport duct, to the point of injection into the flue gas stream in line 14. The residence time of the solids in the humid gas transport duct should be sufficient to effect liquefaction of any deliquescent compound and reaction of carbon dioxide in the duct with the surfaces of the hydrated lime. Transport residence times will usually be in the range of one-half to five seconds.

In the flue gas system 15, steam is taken from the primary or waste heat boiler 16 downstream of the furnace 18 through line 17 for the solids transport system 1. Flue gas flows from the waste heat boiler 16 through line 14 into admixture with a suspension in the said humid gas of hydrated lime coated with calcium carbonate introduced from line 25 at its juncture with line 14. Following introduction of the activated solids to the flue gas, a turbulence promoter 19 comprising a gas-solid mixing device such as a baffle may be optionally employed to secure good distribution of the solids in the flue gas stream. At this point, acid gases and, in particular, sulfur oxides, react with the carbonate-coated solids and are removed from the flue gas. From the distributor, the flue gas flows to the solids collector device 20 which is preferably a baghouse fabric-filter collecter. A portion of the collected fly ash and partially-spent solids may be recycled to silo 8 through line 21 under control of diverter valve 22.

The major flow of purified flue gas is withdrawn downstream of solids collector, or baghouse, 20, and is exhausted by means of blower 23 through stack 24. A small portion of the flue gas (in the Example, 0.14% by volume of the total flue gas flow) is withdrawn downstream of blower 23, through line 7 as controlled by valve 25, and is introduced into line 5 and, by operation of venturi 2, into the humid gas stream flowing in line 4. The flue gas flowing into line 5 and thence into admixture in line 4 with humid gas and hydrated lime subsequently introduced into line 4 will have been substantially purified of acid gases in the flue gas system 15 and will consist largely of nitrogen, with lesser amounts of carbon dioxide, oxygen and water vapor. However, the carbon dioxide in the gas will react rapidly with the moist hydrated lime in line 4 to produce a layer of calcium carbonate on the outer and inner pore surfaces of the hydrated lime particles.

Alternatively, for example, when existing structures make it more economical, a small portion of the flue gas flowing from heat exchanger 16 through line 14 can be diverted through line 26 and into line 5 by operation of valve 27 and, by the action of venturis 2, be introduced into admixture with the humid gas stream flowing in line 4, thus supplying carbon dioxide to the hydrated lime being introduced into line 4.

The use of available steam as the primary conveying fluid for pneumatic transport of alkaline solids in admixture with flue gas flowing from the steam-producing heat exchanger 16 and subsequently into the baghouse 20 is in itself a novel and cost-effective use of such steam. The use of steam to convey hygroscopic solids has been hitherto avoided because of the fear of saturation and plugging in the pneumatic duct. However, steam will usually be available in typical combustion installations at several levels of pressure and degrees of superheat, at which conditions it may be considered as a "dry" gas. the amount of steam required for the pneumatic transport of solids is in the range of 400 to 700 lbs./hr., which is a negligible fraction of the total amount of steam normally generated in the associated boilers. Further, the use of the available low-cost steam for solids conveying saves the costs of air blowers or pneumatic compressors and the operating horsepower usually associated with such conventional devices.

The process as described in detail in the said co-pending application affords direct control of the deliquescent effect when deliquescent compounds are employed and permits the use of a wider range of materials for this purpose than has been previously allowed by the prior art.

EXAMPLE

In a garbage incineration plant, municipal waste is classified and the combustible wastes are incinerated. The incinerator is a rotary kiln incinerator, and following startup with natural gas, the combustion of the wastes is self-supporting. The hot exhaust gases from the incinerator are passed through a waste heat boiler to produce steam. Two parallel combustor/boiler trains are operated, each having a solids waste throughput of 255 tons/day. The solids have a heating value of 4500 Btu/lb. Each boiler produces 59,400 lb./hr. of steam at 600 psig and 700° F., and the lesser amount of steam at 20 psia and 228° F. The flue gas rate exiting each boiler is 40,700 ACFM at a temperature of 400° F., and the gas contains 118 lb./hr. HCl and 46 lb./hr. of $SO_2$, as well as 1481 lb./hr. of particulates. Emission regulations require the flue gas to be treated to remove 80% of the HCl and to have a final particulate concentration of less than 0.05 gr./SCF, when corrected to 7% oxygen. The adiabatic saturation temperature of the flue gas is 140° F.

Hydrated lime and sodium carbonate, each with a particle size less than 200 mesh, are stored in bulk form in silos (one for each material) having a capacity of 35 tons of material, or about 1½ truck loads. The solids are discharged from the storage silo using a bin activator to ensure material flow into two separate solids feed systems. Each solids metering feed system is comprised of separate line volumetric screw feeders, which discharge through a rotary airlock into each of the parallel humid gas conveying lines which serve to transport and pre-moisten the solids. The feed rate of hydrated lime to each line is 200 lb./hr. with sodium carbonate injected at 10% of the lime rate, or 20 lb./hr.

A single steam venturi injector is used to serve both conveying lines, with another injector serving as a standby spare. The conveying medium is a steam-flue-gas mixture adjusted to contain 75 mole percent water vapor at a temperature of 268° F. as follows: The desired mixture humidity is obtained by throttling 500 lb./hr. of 20 psia saturated steam through a jet venturi ejector to a pressure of about 1 psig and a temperature of 227° F. The ejector provides the motive force necessary to convey the solids and induces flue gas flow through a side duct in the venturi throat at a rate controlled by throttling to 309 lb./hr. This flue gas has an analyzed volumetric composition of 71.2% nitrogen, 12.1% oxygen, 5.0% carbon dioxide and 11.7% water. However, the carbon dioxide concentration is known to vary from 2.5 to 10% by volume, depending on the operating conditions. Because the mean molecular weight of the flue gas is about 30, whereas the molecular weight of $CO_2$ is 44, the 309 lbs./hr. of flue gas contains about 7.5 lbs./hr. of $CO_2$ at 5% by volume. Thus, the ratio of $CO_2$ to $Ca(OH)_2$ in the transport duct is 0.375/1. Because only surface area reactions are involved, ratios as low as 0.1 are adequate to effect conversion of pore surface to carbonate. The 309 lb/hr of flue gas corresponds to a volumetric flow rate 115 ACFM @400° F., or about 0.14% of the total flue gas flow.

The resultant conveying gas mixture has a humidity of about 1.833 lb./lb. dry air and a temperature of 268° F. The dew point of the mixture is approximately 198° F., giving a 70% permissible temperature drop before condensation will occur. This safety margin can be increased by preheating the flue gas to a higher temperature than 400° F. The ejector and conveying line are insulated so that the gas is maintained well above the dew point.

The conveying gas velocity in the pneumatic solids transport duct is 80 ft./sec., and with the transport duct run of 70 feet, the residence time in the duct prior to introduction into the flue gas is 0.88 seconds. This dwell time is sufficient for both the adsorption of the monomolecular layer of water which occurs very rapidly and the subsequent carbonation of the hydroxide surfaces of the pores.

Typical $SO_2$ removals for dry lime contacting in the flue gas are of the order of 50%. Surface moisture adsorption increases the removal to the 60–70% level, and the surface carbonation further improves the removal to the 70–80% level and increases the degree of reagent utilization.

Expressed with reference to the preferred embodiment of the invention, finely-divided particles of hydrated lime are dispersed in a humid gas stream consisting of a controlled proportion of carbon dioxide-containing ash-free purified flue gas, steam, and optionally, air, whereby the outer and inner (pore) surfaces of the hydrated lime are reacted with the carbon dioxide to form a surface layer of calcium carbonate upon which is absorbed at least a monomolecular layer of water. The humid gas stream and constituent so-treated particles are then introduced into well-dispersed admixture with the mainstream of flue gas whereby the moist layer of calcium carbonate reacts with the sulfur oxides, primarily sulfur oxide, and hydrochloric acid in the flue gas. Solids in the flue gas, including ash, calcium sulfate, and other reacted and unreacted lime particles, are then separated from the flue gas in a baghouse, or the like, and purified flue gas is discharged through a stack to atmosphere.

The calcium carbonate distributed on the extended area of the pore surfaces of the hydrated lime presents a non-plugging, large reactive area which more efficiently removes sulfur oxides from the flue gas than do non-porous fine particles of calcium carbonate.

I hereby claim:

1. A method for the removal of sulfur oxide gases from a flue gas containing the same the said method comprising: dispersing finely-divided dry hydrated lime in a humid inert gas having a relative water vapor pressure higher than the fugacity of a least a monomolecular layer of water thereby adsorbed on the hydrated lime; bringing the dispersed hydrated lime and adsorbed water into contact with gaseous carbon dioxide thereby converting surfaces of the lime to calcium carbonate; flowing the dispersion of so-carbonated lime into admixture and reactive contact with the said flue gas to form calcium sulfite and sulfates from sulfur oxides in the flue gas; subsequently removing solids including reacted calcium sulfite and sulfate and excess reactants from the so-treated flue gas and discharging so-purified flue gas to the atmosphere.

2. The method of claim 1 in which a portion of the flue gas is employed as the source of carbon dioxide in the carbonation of the hydrated lime.

3. The method of claim 2 in which a portion of the so-purified flue gas is recycled into contact with moist hydrated lime in dispersion in humid inert gas thereby converting the surface of the hydrated lime to calcium carbonate and bringing so-treated hydrated lime into contact with flue gas.

4. A method for the removal of sulfur oxides from hot flue gas without substantial cooling or humidification of the flue gas, the said method comprising: introducing into the hot flue gas a humid gas stream to which carbon dioxide obtained as a constituent of a sidestream of the flue gas has been added, and, in which humid gas there is suspended in finely-divided hydrated lime that has been maintained in said humid gas stream for a time sufficient to effect the adsorption of moisture on the hydrated lime and to convert surfaces of the lime to calcium carbonate; separating solids including calcium sulfate from the so-treated flue gas; and discharging so-treated flue gas from the above acid-gas removal system.

5. The method of claim 1 in which the adsorption of moisture on the hydrated lime is enhanced by also introducing into the humid gas stream a finely-divided deliquescent compound.

* * * * *